US010812847B2

(12) United States Patent
Patel

(10) Patent No.: US 10,812,847 B2
(45) Date of Patent: Oct. 20, 2020

(54) SYSTEMS AND METHODS FOR AVOIDING SPOILERS IN PRESENTING RECORDING PROMPTS RELATING TO A COMPETITION

(71) Applicant: Rovi Guides, Inc., San Jose, CA (US)

(72) Inventor: Milan Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 129 days.

(21) Appl. No.: 15/848,503

(22) Filed: Dec. 20, 2017

(65) Prior Publication Data

US 2019/0191199 A1   Jun. 20, 2019

(51) Int. Cl.
| | |
|---|---|
| *H04N 7/173* | (2011.01) |
| *H04N 21/258* | (2011.01) |
| *H04H 60/27* | (2008.01) |
| *H04N 21/4722* | (2011.01) |
| *H04N 21/472* | (2011.01) |
| *H04N 21/482* | (2011.01) |
| *H04H 20/40* | (2008.01) |
| *H04H 60/65* | (2008.01) |
| *H04H 60/37* | (2008.01) |
| H04H 60/46 | (2008.01) |

(52) U.S. Cl.
CPC ...... *H04N 21/25891* (2013.01); *H04H 20/40* (2013.01); *H04H 60/27* (2013.01); *H04H 60/37* (2013.01); *H04H 60/65* (2013.01); *H04N 21/4722* (2013.01); *H04N 21/47214* (2013.01); *H04N 21/482* (2013.01); *H04H 60/46* (2013.01)

(58) Field of Classification Search
CPC ....... H04N 21/25891; H04N 21/47214; H04N 21/4722
USPC .......................................................... 725/86
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 7,165,098 B1 | 1/2007 | Boyer | |
| 7,761,892 B2 | 7/2010 | Ellis | |
| 8,046,801 B2 | 10/2011 | Ellis | |
| 8,281,341 B2 | 10/2012 | Ellis | |
| 2002/0174430 A1 | 11/2002 | Ellis | |
| 2005/0251827 A1 | 11/2005 | Ellis | |
| 2007/0157237 A1* | 7/2007 | Cordray | ................ H04H 60/65 725/42 |
| 2007/0220554 A1* | 9/2007 | Barton | ............... H04N 21/4668 725/46 |
| 2010/0153885 A1 | 6/2010 | Yates | |
| 2011/0078174 A1 | 3/2011 | Lee | |
| 2014/0237500 A1* | 8/2014 | Joao | ................ H04N 21/25891 725/25 |

\* cited by examiner

*Primary Examiner* — Michael B. Pierorazio
(74) *Attorney, Agent, or Firm* — Haley Guiliano LLP

(57) ABSTRACT

Systems and methods are described for a media guidance application (e.g., implemented on a user device) that avoids spoilers in presenting recording prompts relating to a competition by scheduling presentation of notifications according to the user profile.

18 Claims, 7 Drawing Sheets

SYSTEMS AND METHODS FOR AVOIDING SPOILERS IN PRESENTING RECORDING PROMPTS RELATING TO A COMPETITION

BACKGROUND

The amount of media available to users in any given media delivery system can be substantial. Users simply have no time to watch all available media that is of interest to them, and must rely on conventional media systems to manually record media they have missed, for viewing at a later time. For specific types of media assets (e.g., sports games broadcasts), a user may not know when to record upcoming games because the teams or players that are of interest to the user may not qualify for the tournament, may get eliminated, or may have their game rescheduled. On the other hand, conventional media systems that automatically record media or cancel scheduled recordings may alert the user of a scheduled recording change at an inappropriate time, and in turn spoil the results of a competition. For example, suppose the user's favorite basketball team has won three games in a best-of-seven series of the NBA playoffs. The conventional media system may inform the user that it is scheduled to record the fifth game, indicating the user's favorite team lost in the fourth game and needs to play additional games. This prevents the user from fully enjoying the media asset if he/she chooses to view it because he/she already knows the results.

SUMMARY

Systems and methods are described to address shortcomings in the conventional media systems via a novel technique for avoiding spoilers in presenting recording prompts relating to a competition. Unlike conventional media systems, these systems and methods may automatically record upcoming game broadcasts of teams or players that are of interest to the user. If the team or player exits the tournament, the systems and methods may alert the user of the result at an appropriate time based on, but not limited to, the user's viewing history, preferences, and calendar. The systems and methods disclosed herein facilitate a determination of whether a participant of interest may appear in a subsequent round of a competition based on a competition rule for the competition, and a result of the competition. For example, the systems and methods may determine that a tennis competition has a best-of-three-matches competition rule, where a participant qualifies for a subsequent round by winning at least two of three matches within a round. If the participant of interest qualifies for the next round according to the competition rule, the systems and methods can add a media asset corresponding to a subsequent competition round to the list of scheduled recordings for a user. If the participant does not qualify for the subsequent round, the systems and methods can add a phantom media asset identifier to the list of scheduled recordings for a user. A phantom media asset identifier represents a placeholder that is associated with the competition that would potentially happen if the participant had indeed qualified for the subsequent round. It should be noted that the phantom media asset identifier will not actually be recorded because no media asset will be transmitted. The phantom media asset identifier prevents the results of a competition from being spoiled based on the list of scheduled recordings for a user (e.g., the user can determine that the competitor was eliminated in a specific round because no subsequent rounds are scheduled to be recorded). Until the user knows the outcome of the competition, the phantom media asset identifier will appear in the scheduled recordings.

The systems and methods described herein may be useful in cases where a competition spans a duration of days, weeks, or months. The systems and methods may be useful in cases where the competition follows a deterministic competition rule over that duration. In these cases, where the competition follows a deterministic rule, an outcome of the competition can be determined with certainty based on whether a certain condition has been met. For example, the competition may follow a triple elimination round rule where a participant is eliminated from the competition based on losing any three games within a round of the competition. For example, the competition may follow a consecutive triple elimination match rule where a participant is eliminated from the competition based on losing three consecutive matches within a round. The systems and methods may modify a list of scheduled recordings based on the determination of the certain outcome. For example, if a participant of interest is eliminated from a competition, the systems and methods may cancel scheduled recordings for subsequent instances of media assets of the set of media assets related to the competition. For example, if a participant of interest qualifies for a subsequent round of a competition, the systems and methods may add to a scheduled recording list a subsequent instance of a media asset in which the participant is expected to appear.

The systems and methods described herein may be useful in cases where the user has not viewed all the stored media assets and does not want to be notified of the outcomes of the unseen media assets. For example, the user may be interested in viewing the progress of his/her favorite team in the NBA playoffs. If the team participated in three games before being eliminated and the user has not viewed all three games, the systems and methods may inform the user of the tournament result after the user has viewed all three games. The systems and methods may also refer to a user profile to determine whether the user is available to view the stored media assets. If the systems and methods determine that the user does not have time to view the stored media assets, the systems and methods may alert the user of the competition result and provide a summary and highlights reel of the competition at a time when the user is available.

The systems and methods disclosed hereby may identify a competitor in the competition that is of interest to a user. The systems and methods may determine whether the competitor is featured in any of a plurality of media assets associated with the competition scheduled for transmission in the future, and schedule presentation of a notification to the user that the competitor is not featured in any of the plurality of media assets associated with the competition based on a user profile.

In some aspects, systems and methods are provided for avoiding spoilers in presenting recording prompts related to a competition. The systems and methods may identify a competitor in the competition that is of interest to a user. For example, the systems and methods may identify a user's favorite NFL football team that is participating in the NFL playoffs. In some embodiments, identifying the competitor comprises receiving search criteria from the user specifying a team or player. For example, the user may specify the team of interest as the "New England Patriots," or specify "Tom Brady," the quarterback in the New England Patriots, in a search box. In some embodiments, identifying the competitor comprises searching a user profile to identify a team or player that is associated with the user. For example, the user may have a viewing history that has multiple occurrences of the user watching football games featuring the New England Patriots. The systems and methods may identify the New England Patriots as a competitor of interest to the user.

The systems and methods may search for media asset information to identify a plurality of media assets, associated with the competition, scheduled for transmission in the future. For example, the systems and methods may search for information about upcoming playoff games scheduled for streaming. Specifically, the systems and methods may retrieve media guidance data and analyze the media guidance data to determine broadcast times and sources for instances of the playoff football games.

The systems and methods may process data associated with the plurality of media assets to determine whether the competitor is featured in any of the plurality of media assets associated with the competition. For example, suppose the competitor of interest is the New England Patriots team. The systems and methods may process data associated with the playoff game broadcasts or streams to determine that the New England Patriots will be featured in them. In some embodiments, processing data comprises receiving a competition result associated with the identified competitor, retrieving a competition rule associated with the competition, and determining based on the competition rule and the competition result that the identified competitor does not advance from a first portion to a second portion of the competition. For example, the competition result may indicate that the New England Patriots had 18 points and the Denver Broncos, their opposition, had 20 points in the first portion of the competition (e.g., the conference championship game). The competition rule may state that the competitor with the most points in the conference championship game may advance to the second portion of the competition, the Super Bowl. The systems and methods may determine that the New England Patriots had fewer points than the Denver Broncos in the conference championship game, and will not advance to the Super Bowl, based on the competition rule. If the game is a part of the regular season, the competition rule may further detail that the top eight teams with the most wins in the regular season will advance to the NFL playoffs.

The systems and methods may determine that the competitor is featured in at least one of the media assets associated with the competition, and in response, cause at least one media asset to be stored for the user. For example, the systems and methods may determine that a playoff game stream is scheduled for 8:30 pm and will feature the New England Patriots. The systems and methods may store that playoff game stream for the user.

The systems and methods may determine that the competitor is not featured in any of the plurality of media assets associated with the competition and in response, retrieve a user profile associated with the user; and schedule presentation of a notification to the user that the competitor is not featured in any of the plurality of media assets associated with the competition based on the retrieved user profile. For example, the systems and methods may determine that New England Patriots are not featured in any of the upcoming playoff game broadcasts. This may signify that the New England Patriots have been eliminated from the playoffs, or were not a part of the competition altogether. If the competition is the NFL regular season, the New England Patriots not being featured in future football games broadcasts or streams can signify that the team's season has ended. In response, the systems and methods may schedule a notification for the user based on the user's profile. For example, this notification may inform the user that the New England Patriots have been eliminated from the NFL playoffs or their season has ended. Suppose the retrieved user profile details that the user is currently watching all New England Patriots playoff games. If the New England Patriots won in the first two rounds and were eliminated in the third round, the systems and methods may schedule the notification that the New England Patriots were eliminated after the user has completed watching the third round.

The notification serves two purposes. The first purpose is to inform the user that the competitor has been eliminated from the competition of interest to the user. This is facilitated by a textual description stating that the competitor has been eliminated, as well as highlights of the competition through any combination of text, audio, and video. The second purpose is to inform the user that the list of scheduled recordings will no longer include media assets associated with the competition featuring the competitor. This is because the competitor is no longer participating in the competition. In response, the systems and methods may offer related media assets that the user can add to the list of scheduled recordings instead.

In some embodiments, the competition result is associated with a previously available media asset featuring the competitor. In such cases, the systems and methods determine from the user profile, whether the user has viewed the previously available media asset at a scheduled transmission time of the previously available media asset. For example, if the playoff game stream featuring the New England Patriots and the Denver Broncos took place on Sunday night and the systems and methods are checking the following morning, the systems and methods may refer to the user profile to determine whether the playoff game stream is in the user's viewing history.

In some embodiments, the system and methods may schedule the presentation of the notification at the end of the scheduled transmission time of the previously available media asset, in response to determining that the user has viewed the previously available media asset featuring the competitor during the scheduled transmission time of the media asset. For example, suppose the user has viewed the conference championship game stream at the time of its scheduled transmission. The systems and methods may then present the notification, informing the user that New England Patriots games will no longer be available because of the team's elimination, after the end of the conference championship game stream.

In some embodiments, the system and methods may schedule the presentation of the notification at the end of the latest stored media asset associated to the competition, in response to determining that the user has viewed the latest stored media asset featuring the competitor. For example, suppose the systems and methods have stored two games of the NFL playoffs featuring the New England Patriots. Suppose the New England Patriots are eliminated during the second game. The systems and methods may present the notification, informing the user that New England Patriots games will no longer be available because of the team's elimination, after the user has completed watching the second game (e.g., the latest stored media asset).

In some embodiments, the s systems and methods may determine that the user has not viewed the previously available media asset featuring the competitor during the scheduled transmission time. In response, the systems and methods may determine, based on the user profile, whether the user has future availability to view a stored version of the previously available media asset. In response to determining the user has future availability to view the stored version of the previously available media asset, the systems and methods may schedule the presentation of the notification immediately after the user views the stored version of the previously available media asset. Revisiting the previous example, the user may not have viewed the conference championship game stream featuring the New England Patriots. In turn, the systems and methods may determine that the user has not viewed the game stream because his/her user profile does not include the game stream in the viewing history. In response, the systems and methods may determine that the user has future availability to view the stored version of the game stream. In some embodiments, determining whether the user has future availability to view the stored version of the previously available media asset comprises retrieving a calendar associated with the user, identifying content a user plans to access based on the calendar, and determining whether there is a gap in the calendar in which the user does not plan to access content that has a length corresponding to a duration of the stored version of the previously available media asset. For example, the systems and methods may refer to the user profile and retrieve the user's weekly schedule of media assets. Suppose the New England Patriots conference championship game video is three hours long. If the user's calendar indicates that the user intends to watch "Game of Thrones" between 3:00 pm and 4:00 pm, followed by "CNN News" between 8:00 pm and 9:00 pm, the systems and methods may determine that the user is free for four hours between 4:00 pm and 8:00 pm. Therefore, the user can watch the stored video of the playoff game. In response to determining that the user has future availability, the systems and methods may schedule a notification after the user has watched the stored video of the conference championship game.

In some embodiments, the systems and methods may determine that the user does not have future availability to view a stored version of the previously available media asset. In response, the systems and methods may schedule the presentation of the notification at the end of the scheduled transmission time and present a summary of the previously available media asset. The summary may include an option to access at least one of video, audio, and textual highlights of the previously available media asset. For example, the systems and methods may refer to the user profile and retrieve the user's weekly schedule of media assets. The user's calendar may indicate that user intends to watch "Game of Thrones" between 3:00 pm and 4:00 pm, followed by "The Simpsons" between 4:00 pm and 8:00 pm, and "CNN News" between 8:00 pm and 9:00 pm, every day. Suppose the user watches stored media only between 3:00 pm and 9:00 pm. As such, the systems and methods may determine that the user will not be available to view the conference championship game featuring the New England Patriots and may schedule the presentation of the notification that the New England Patriots have been eliminated from the playoffs at the end of the scheduled transmission of the conference championship game. Alongside the notification, the systems and methods may provide a summary of the game score, and provide highlights of important plays in the game and analysis of player and team performance.

In some embodiments, the systems and methods may detect that the user has viewed an alternative media asset that features the competition result of the competition featuring the competitor, and schedule presentation for a notification at the end of the alternative media asset. For example, the user may come across a commercial or a news channel that presents the outcome of the competition of interest to the user. For example, the user may watch the sports section of Fox News in which the sports anchor states the New England Patriots were eliminated by the Denver Broncos in the conference championship game. The systems and methods may parse the news stream's audio using speech recognition techniques to detect keywords such as the competitor's name, the competition's name, "lost," "eliminated," and the final score. For example, the sports anchor may state "the New England Patriots lost the conference championship game to the Denver Broncos last night." The systems and methods may also parse the news stream's video data using computer vision techniques to identify video frames that have overlaid text headlines or game highlights from the competition featuring the competitor. For example, the video may feature headlines stating "New England Patriots Eliminated in Conference Finals" or the video may feature highlights of the game with a final score overlaid. If the user has not already viewed the stored media asset featuring the competition that the sports anchor or headlines are referring to, the systems and methods may present a notification that the user's competitor has been eliminated at the end of the sports section news.

In a similar example, the user may encounter a commercial that is promoting the next round of the NFL football playoffs to which the user's competitor, the New England Patriots, will not advance. The commercial may state, for example, "after defeating the New England Patriots in the conference championship, the Denver Broncos are all set to compete in the Super Bowl this Sunday at 8 pm." The systems and methods may parse the stream featuring the commercial to detect keywords such as "New England Patriots," "Denver Broncos," "conference championship," and "defeating." The systems and methods may further determine whether these keywords correspond to the competition result and, in response to determining that the keywords correspond to the competition result, schedule presentation of the notification to the user at the end of the commercial that the competitor is no longer in the competition.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
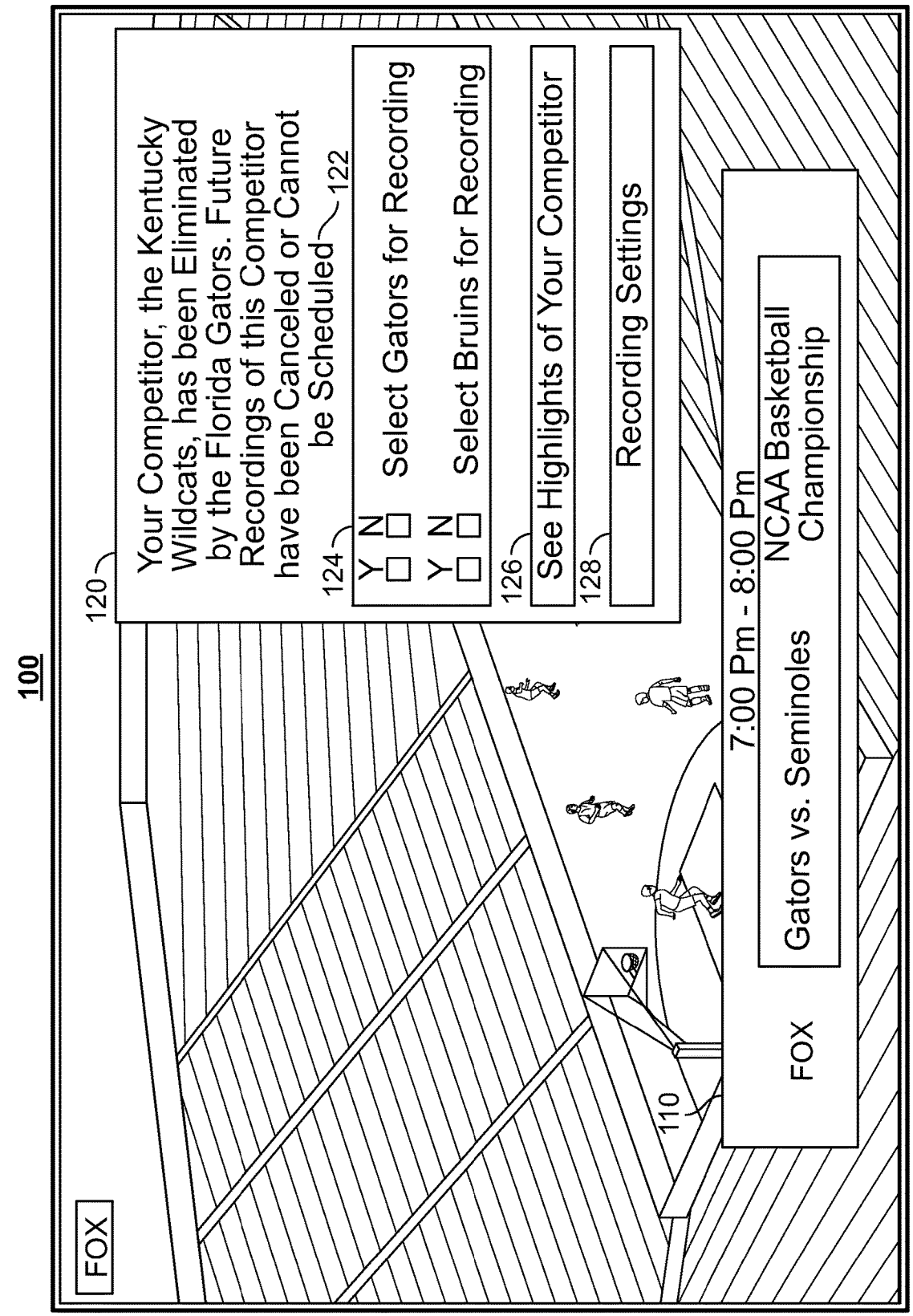
FIGS. 1, 2 and 3 show illustrative examples of display screens generated by a media guidance application in accordance with some embodiments of the disclosure.

Systems and methods are described to address shortcomings in the conventional media systems via a novel technique for avoiding spoilers in presenting recording prompts relating to a competition. The systems and methods may identify a competitor in the competition that is of interest to a user, determine whether the competitor is featured in any of a plurality of media assets associated with the competition scheduled for transmission in the future, and schedule presentation of a notification to the user that the competitor is not featured in any of the plurality of media assets associated with the competition based on a user profile.

The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Consider a scenario in which two college basketball teams, the Kentucky Wildcats and the Florida Gators, are competing in the NCAA Basketball Championship tournament. The user is interested in knowing the outcome of all games associated with the Kentucky Wildcats. Accordingly, the media guidance application identifies the Kentucky Wildcats as the competitor in the competition of interest to the user, the NCAA Basketball Championship tournament. Furthermore, the media guidance application determines the scheduled broadcast timings of the games featuring the Kentucky Wildcats and adds them to a list of scheduled recordings. The user may also have requested to record instances of the set of media assets in which the Kentucky Wildcats participate.

Suppose that the user is unable to watch the video broadcast of an upcoming NCAA Basketball Championship game featuring the Kentucky Wildcats as they face the Florida Gators, during the scheduled transmission time on a Monday night. Nonetheless, the media guidance application stores the media asset for later viewing. Furthermore, suppose that after competing in one game, the Kentucky Wildcats are eliminated by the Florida Gators in round one, after losing the game in which they scored 91 points and the Florida Gators scored 97 points. If the Kentucky Wildcats defeated the Florida Gators, they would have advanced to the next round to face the Florida State Seminoles. Instead, the Florida Gators are now advancing to the next round to face the Florida State Seminoles. The media guidance application retrieves the competition result and compares it to the competition rule. In this case, the competition rule states that the team with the higher number of points advances to the next round, and the competition result is that the Kentucky Wildcats scored 91 points while the Florida Gators scored 97 points. The media guidance application determines that the Kentucky Wildcats have been eliminated by the Florida Gators based on the competition result and competition rule.

The media guidance application then initiates the process of scheduling presentation of a notification informing the user that the Kentucky Wildcats have been eliminated from the NCAA Basketball Championship tournament and that future recordings featuring the Kentucky Wildcats cannot be scheduled because the Kentucky Wildcats will no longer play. The media guidance application then determines whether the user intends to view the stored version of the media asset (e.g., recording of the game). Suppose the stored version of the media asset has a duration of two hours. The media guidance application retrieves the user profile and analyzes the list of scheduled recordings, the user's watch-list calendar, etc., and determines that the user has availability to view the stored version of the media asset. For example, the user may not have anything scheduled for viewing on Saturday between 8:00 pm and 11:30 pm. The media guidance application may add the stored version of the media asset to the user's watch-list calendar at 8:30 pm and schedule presentation of the notification that the competitor, the Kentucky Wildcats, has been eliminated, once the user has completed watching the stored version of the media asset (e.g., 10:00 pm).

However, suppose that the round two game of the tournament will be broadcasted on Thursday night at 8:00 pm. Rather than watching the stored version of the media asset, the user decides to watch the next game in the tournament (e.g., round two) and discovers that the user's competitor, the Kentucky Wildcats, has been eliminated. The round two game instead features the Florida Gators and the Florida State Seminoles. In response, the media guidance application determines that the user is viewing the next portion of the competition in which the Kentucky Wildcats are no longer participating, cancels the scheduled presentation of the notification at 10:00 pm Saturday, and immediately presents the notification described in FIG. 1.

FIG. 1 shows an illustrative example of a display screen 100 generated by the interactive media guidance application in accordance with some embodiments of the disclosure. In the example, the interactive media guidance application has determined that the competitor, the Kentucky Wildcats, participating in the NCAA Basketball Championship competition has been eliminated by the Florida Gators. For example, the interactive media guidance application may have determined that the competition rule details that the competitor with the most points at the end of a game advances to the next round. As referred to herein, the phrase "competition rule" should be understood to mean a set of conditions and relations that is used to determine or estimate whether a participant advances from a first portion of a competition to a second portion of the competition. As referred to herein, the phrase "probabilistic rule" should be understood to mean a set of conditions and relations that is used to estimate a likelihood of whether a participant advances from a first portion of a competition to a second portion of the competition based on a threshold. In some embodiments, the threshold may have been set by a user manually, or may have been set by the interactive media guidance application based on adaptively determining a level of a user's interest in a team based on performance of the team during a season competition. As referred to herein, the phrase competition result should be understood to mean an outcome of a portion of a competition (e.g., a game, match, round, any other suitable portion or any combination thereof). The interactive media guidance application may have determined that in their last game the Kentucky Wildcats scored 91 points and the Florida Gators scored 97 points. Since the Florida Gators scored more points, the media guidance application may determine that the Florida Gators advance to the next round and the Kentucky Wildcats are eliminated from the competition.

The overlay 110 informs the user of details associated with the content he/she is are viewing. For example, if the user is watching a basketball game featuring the teams, the Gators and the Seminoles, the overlay may indicate the time the game broadcast began and the time it is expected to end. The broadcast channel logo and number will be displayed if available. The overlay may also provide a description of the content that the user is viewing. For example, textual data stating "NCAA Basketball Championship: Gators v. Seminoles" may be displayed.

The overlay 120 may include a first portion 122 providing a notification of one or more selectable options (e.g., selectable options 124, 126, 128). In this example, the notification 122 informs the user that his/her competitor, the Kentucky Wildcats, has been eliminated from the NCAA Basketball Championship by the Florida Gators. Furthermore, it states that future recordings of the Kentucky Wildcats have either been cancelled or cannot be scheduled.

The purpose of scheduling presentation of a notification (e.g., presented as an overlay 120) is to prevent the results of competitions from being spoiled for a user. Presentation of a notification should ideally happen when the user is aware of the outcome of a competition featuring the competitor. For example, this may be the case when the user has watched the original broadcast of the game, or the user has watched the stored media asset of the game, or the user has found out the outcome through another source (e.g., a conversation, a poster, a magazine, etc). In the first two cases, the media guidance application can determine (e.g., via control circuitry 404 (discussed in FIG. 4 description)) that the user has watched the original broadcast of the game or the stored media asset of the game based on the user profile (e.g., retrieved from storage 408 (discussed in FIG. 4 description)). The user profile may provide information to the media guidance application of the user's viewing history. For example, if the media guidance application determines that user has already viewed the game in which the competitor was eliminated based on the user's viewing history, the media guidance application may determine that notification be presented immediately.

Furthermore, the media guidance application may determine (e.g., via control circuitry 404 (discussed in FIG. 4 description)) that the user is viewing the second portion of the competition. This determination can be based on information the media guidance application receives (e.g., from media guidance data source 518 or communication network 514 (discussed in FIG. 5 description)) from Internet data sources (e.g., RSS feeds, news sources, social media sources, etc.) that indicate that the second portion of the competition has begun. The example triggering the notification in FIG. 1 is applicable in this case. In the example, the user's competitor, the Kentucky Wildcats, has been eliminated in the first round of the NCAA Basketball Championship tournament. Even if the user does not watch the first-round game featuring the Kentucky Wildcats, if the user begins watching the second-round game during its scheduled transmission time, the media guidance application may present the notification that the Kentucky Wildcats have been eliminated. This is because the second-round game will feature different competitors, and the user may be aware that the Kentucky Wildcats have been eliminated due to their absence from the second-round game.

In some embodiments, the media guidance application may determine (e.g., via control circuitry 404 (discussed in FIG. 4 description)) that the user has viewed an alternative media asset that features the competition result of the competition featuring the competitor, and schedule presentation for a notification at the end of the alternative media asset. For example, the user may come across a commercial or a news channel that presents the outcome of the competition of interest to the user. For example, the user may watch the sports section of Fox News in which the sports anchor states the Kentucky Wildcats were eliminated by the Florida Gators from the NCAA Basketball Championship tournament. The media guidance application may parse the news stream's audio using speech recognition techniques to detect keywords such as the competitor's name, the competition's name, "defeated," "eliminated," and the final score. For example, the sports anchor may state "the Kentucky Wildcats were eliminated from the playoffs by the Florida Gators last night." The media guidance application may also parse the news stream's video data using computer vision techniques to identify video frames that have overlaid text headlines or game highlights from the competition featuring the competitor. For example, the video may feature headlines stating "Kentucky Wildcats Defeated by the Florida Gators" or the video may feature highlights of the game with a final score overlaid. If the user has not already viewed the stored media asset featuring the competition that the sports anchor or headlines are referring to, the media guidance application may present a notification as an overlay 120 that the user's competitor has been eliminated at the end of the sports section news.

In a similar example, the user may encounter a commercial that is promoting the next round of the NCAA Basketball Championship tournament in which the user's competitor, the Kentucky Wildcats, will not advance. The commercial may state for example "after defeating the Kentucky Wildcats in the NCAA Basketball Championship tournament, the Florida Gators are all set to face the Florida State Seminoles this Sunday at 8 pm." The media guidance application may parse the stream featuring the commercial to detect keywords such as "Kentucky Wildcats," "Florida Gators," "NCAA" and "defeating." The media guidance application may further determine whether these keywords correspond to the competition result and, in response to determining that the keywords correspond to the competition result, schedule presentation of the notification to the user at the end of the commercial that the competitor is no longer in the competition.

To detect that the competition result is featured in the alternative media asset (or lack thereof), the media guidance application may use one or more detection modules. A detection module of the media guidance application may include one or more content-recognition modules, which may be used by the media guidance application to analyze information received from a content capture device (e.g., video and/or audio recorder). For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of video, audio, and textual data. For example, the media guidance application may receive a media asset in the form of a video of the actions of a user. The video may include a series of frames. For each frame of the video, the media guidance application may use an object recognition module to determine the characteristics associated with each frame (or the media assets as a whole) of the video to determine whether or not a particular media object (e.g., an image in a frame of the video, a word in the subtitle data of the video, etc.) occurs.

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data. For example, the content-recognition module may analyze audio data to determine whether or not a media object is present (e.g., whether or not a character in the media asset has spoken a keyword). Furthermore, the content-recognition module may analyze video and/or audio data to determine whether or not the competition result is featured in the alternative media asset.

The first selectable option 124 may ask the user if they wish to record the upcoming media assets of the team or player that eliminated their competitor. Based on receiving a user selection of the first selectable media option, and an affirmative response (e.g., selection of "Y"), the media guidance application may continue recording games in which the Florida Gators are expected to participate. Based on receiving a negative response (e.g., selection of "N"), the media guidance application may not record games in which the Florida Gators are expected to participate, for example, by removing subsequent instances including the Florida Gators as participants from the list of scheduled recordings. For example, this confirmation enables a user to selectively cancel recordings for instances of the set of media assets in order to conserve storage space on a recording device (e.g., local recording device at a user equipment device within the user's home, or at a remote recording device at a remote server).

Depending on the competition and competition rule, the first selectable option 124 may request that a user confirm whether to continue recording games associated with his/her competitor. For example, in a competition such as the regular NBA basketball season, the competition rule may detail that the top eight teams with the most wins in each conference will advance to the NBA playoffs. Suppose a user selects a team that has four games remaining in the season, but requires twenty additional wins to become a part of the top eight teams in the team's conference. In this case, the media guidance application may determine that the team selected by the user cannot satisfy the competition rule. However, because the team has four remaining games in their season, the media guidance application may request the user to confirm whether to continue recording games featuring the team. Suppose the user selects the New York Knicks. Based on receiving a user selection of the first selectable media option, and an affirmative response (e.g., selection of "Y"), the media guidance application may continue recording season games in which the New York Knicks are expected to participate. Based on receiving a negative response (e.g., selection of "N"), the media guidance application may stop recording season games in which the New York Knicks are expected to participate, for example, by removing subsequent instances including the New York Knicks as participants from the list of scheduled recordings. This confirmation enables the user to confirm whether to continue recording subsequent games in which the New York Knicks are scheduled to play, even though the subsequent games likely will not affect whether the New York Knicks can participate in a final tournament. For example, this confirmation enables a user to selectively cancel recordings for instances of the set of media assets in order to conserve storage space on a recording device (e.g., a local recording device at a user equipment device within the user's home, or at a remote recording device at a remote server).

In some embodiments, the first selectable option may enable the user to instruct the media guidance application to record games that include another participant instead of the user's competitor or the team that eliminated the user's competitor. For example, the media guidance application may determine, based on a user profile created by the user, that the user has a preference hierarchy for a plurality of teams, of which the Kentucky Wildcats has a highest preference priority. The media guidance application may select the team with the next highest preference priority from the preference hierarchy.

The second selectable option 126 may enable the user to view highlights of the games featuring the user's competitor. For example, the user may select to view video, audio, or textual information about their competitor's performance in their last game. This information may be displayed in the form of a game summary, a box-score, video highlights of key plays, post-game analysis by sports analysts, and commentary from the game. Revisiting the example depicted in FIG. 1, the user may select option 126 to be informed that the final score of the Kentucky Wildcats and the Florida Gators game was 91 to 97, and to view prominent moments of the game such as slam dunks and fast breaks.

It should be noted that the second selectable option 126 is made available to the user when the media guidance application determines that the user has not seen the media asset or does not have the availability to view it. For example, a user may be able to view the stored version of the media asset or the media asset at the scheduled transmission time. In these situations, the user may not need to view the highlights because the user has already seen the game. In the case that the user has not seen the media asset, the media guidance application may schedule presentation of the notification based on the user's availability. In some embodiments, the media guidance application may determine (e.g., via control circuitry 404 (discussed in FIG. 4 description)) that the user does not have future availability to view a stored version of the previously available media asset. For example, the media guidance application may refer to the user profile and retrieve the user's weekly viewing schedule of media assets. The user's calendar may indicate that the user intends to watch "Game of Thrones" between 3:00 pm and 4:00 pm, followed by "The Simpsons" between 4:00 pm and 8:00 pm, and "CNN News" between 8:00 pm and 9:00 pm, every day. Suppose the user only watches stored media between 3:00 pm and 9:00 pm. As such, the media guidance application may determine that the user will not be available to view the stored version of the media asset. In this case, the media guidance application may present the notification immediately to the user and the notification will contain the second selectable option 126.

The notification overlay 120 serves two purposes. The first purpose is to inform the user that the competitor has been eliminated from the competition of interest to the user. This is facilitated by a textual description such as 122, stating that the competitor has been eliminated, as well as highlights of the competition (e.g., second selectable option 126) through any combination of text, audio, and video. The second purpose is to inform the user that the list of scheduled recordings will no longer include media assets associated with the competition featuring the competitor. This is because the competitor is no longer participating in the competition. In response, the media guidance application may offer related media assets that the user can add to the list of scheduled recordings instead.

The third selectable option 128 may enable the user to modify the list of scheduled recordings. For example, based on receiving a user selection of the third selectable option, the media guidance application may generate for display a menu that enables the user to manually select instances for removal from the list of scheduled recordings. Alternatively, or in addition (e.g., as part of the same display), the media guidance application may generate for display a menu that enables the user to manually add subsequent instances from the set of media assets to the list of recordings.

In some embodiments, the media guidance application may add a phantom media asset identifier to the list of scheduled recordings, in response to determining that the competitor does not advance from a first portion to a second portion of the competition. A phantom media asset identifier represents a placeholder that is associated with the second portion of the competition, which would potentially feature the competitor if they satisfied the competition rule (e.g., the competitor advanced to the next round). It should be noted that the phantom media asset identifier will not actually be recorded because no media asset will be transmitted. The phantom media asset identifier serves as a mechanism to prevent spoilers. It prevents the results of a competition from being spoiled based on the list of scheduled recordings for a user (e.g., the user can determine that the competitor was eliminated in a specific round because no recordings are scheduled for subsequent rounds). Until the user knows the outcome of the competition, the phantom media asset identifier will appear in the scheduled recordings.

Alternatively, or in addition (e.g., as part of the same display), the media guidance application may generate for display a menu that enables the user to input another participant of interest for subsequent recordings. Based on receiving the input of another participant, the media guidance application may query media guidance data or other data (e.g., from Internet data sources such as RSS feeds, social media sources and real-time data sources), determine media assets in which another participant is expected to participate, and add those media assets to the list of scheduled recordings. Examples of scheduling of media assets based on data sources is described from example in Lee et al., U.S. Patent Publication No. 2011/0078174, filed Sep. 30, 2009, which is hereby incorporated by reference herein in its entirety. Examples of scheduling of media assets based on media guidance data is described from example in Ellis et al., U.S. Pat. No. 8,281,341, issued Oct. 2, 2012, which is hereby incorporated by reference herein in its entirety.

Figure 2:
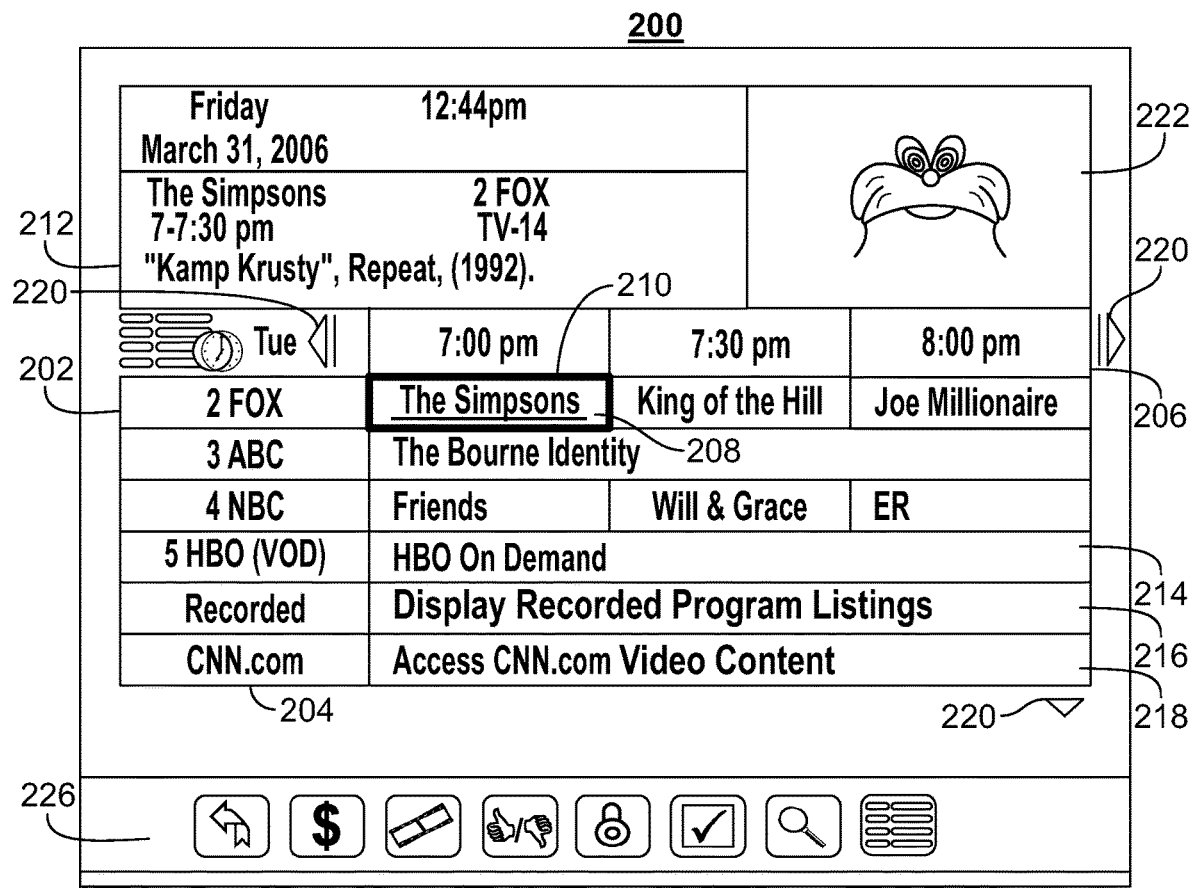
Figure 3:
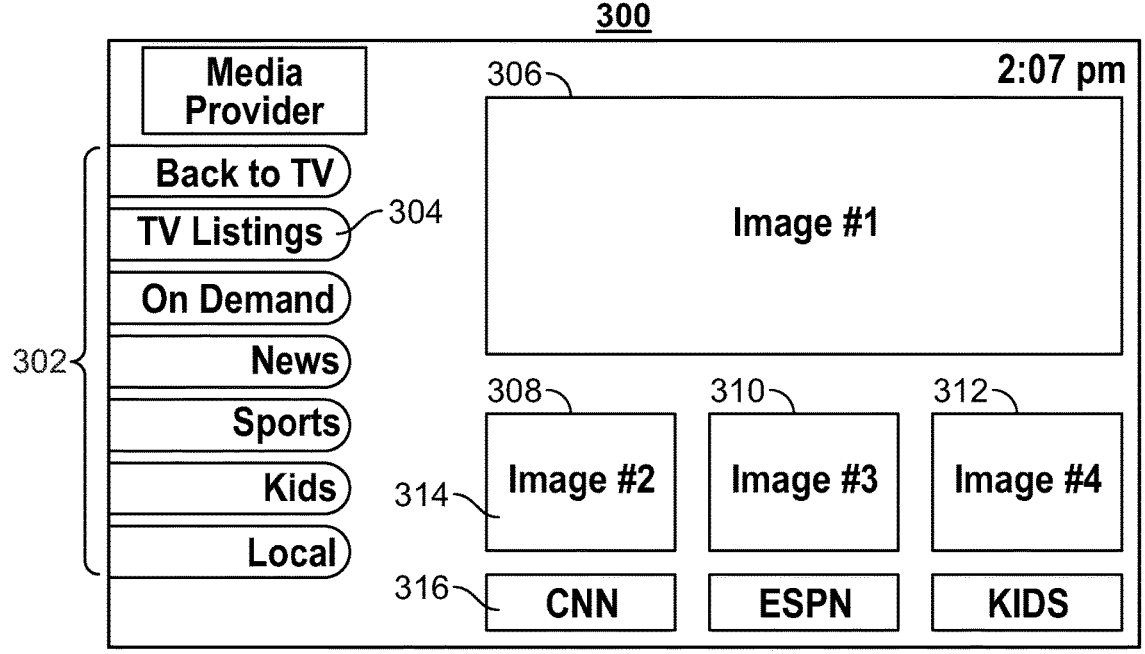

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. In some embodiments, display 200 may include a selectable option (not shown) to access a display of a list of scheduled recordings. For example, the media guidance application may generate for display the list of scheduled recordings that is similar to a display generated for display in response to a selection of third selectable option 128 of FIG. 1. In some embodiments, the display 110 of FIG. 1 may be generated for display over grid display 200 upon invoking the display 200, instead of over a video of a media asset. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. For example, the media guidance application may determine through monitoring content the user access, the preference hierarchy of teams that was discussed in reference to the selection of second selectable option 126 in FIG. 1. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In some embodiments, the display 110 of FIG. 1 may be generated for display over grid display 300 upon invoking the display 300, instead of over a video of a media asset. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
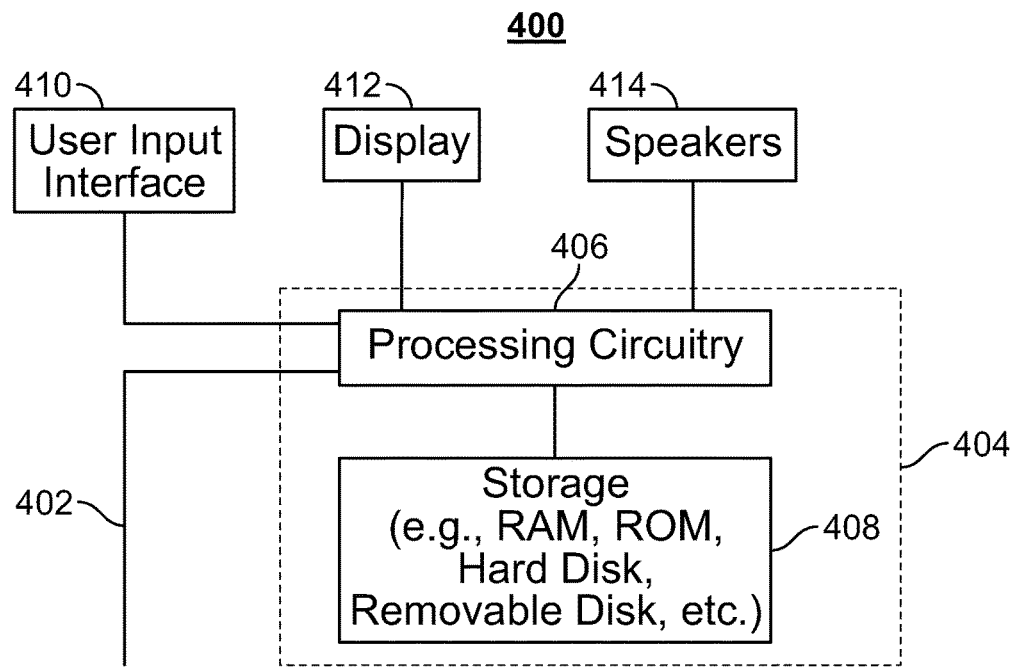
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
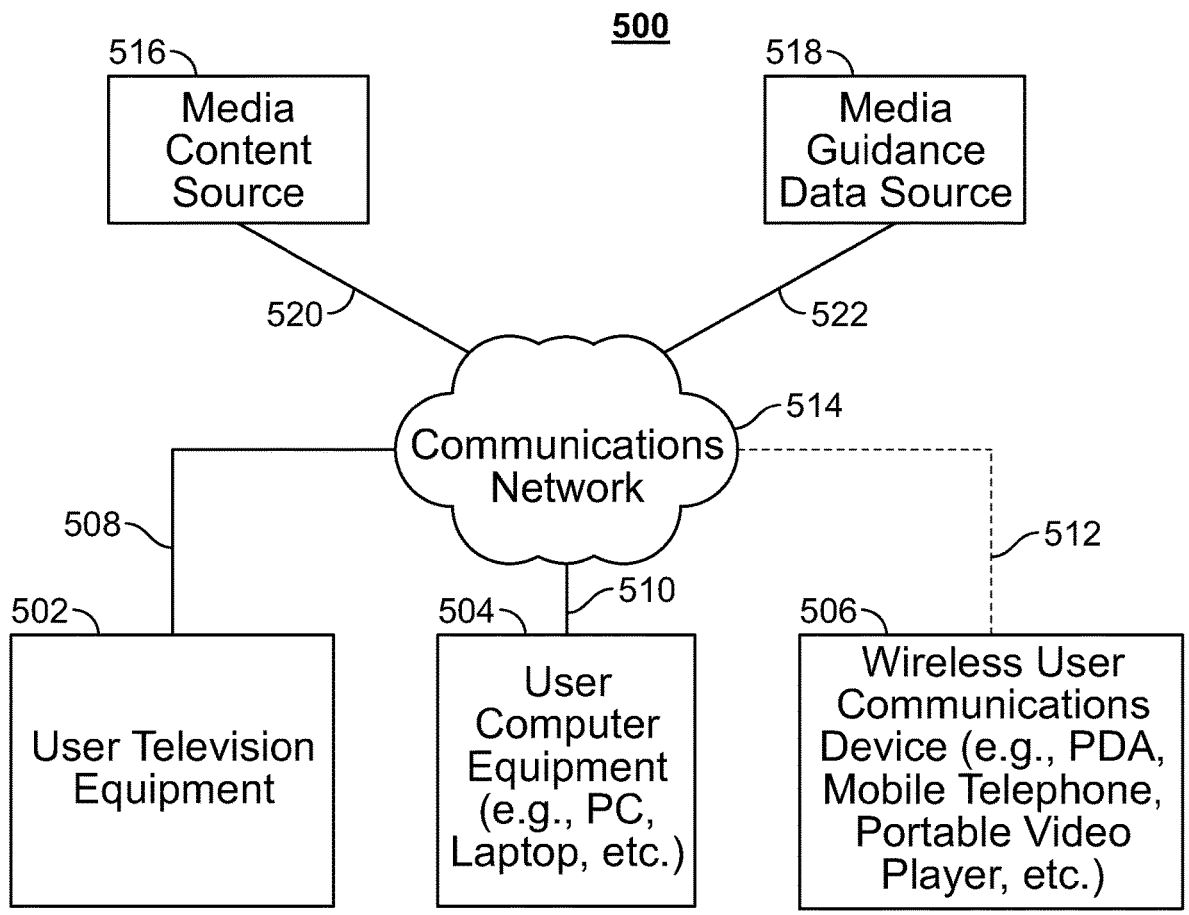
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment.

For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device. In some embodiments, the OTT sources may include Internet data sources such as RSS feeds, social media sources, news sources, or other sources that are updated at a more frequent interval than conventional media guidance data. For example, the OTT sources may include a database from which blobs of data (e.g., javascript object notation (JSON) data, or any other suitable data format) for sporting events may be queried and retrieved by user equipment devices 402, 404, and 406.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4. In some embodiments, the cloud resources may include data sources such as RSS feeds, social media sources, news sources, or other sources that are updated at a more frequent interval than conventional media guidance data. For example, the cloud resources may provide data (e.g., javascript object notation (JSON) data, or any other suitable data format) for sporting events and may be queried and retrieved by user equipment devices 402, 404, and 406.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
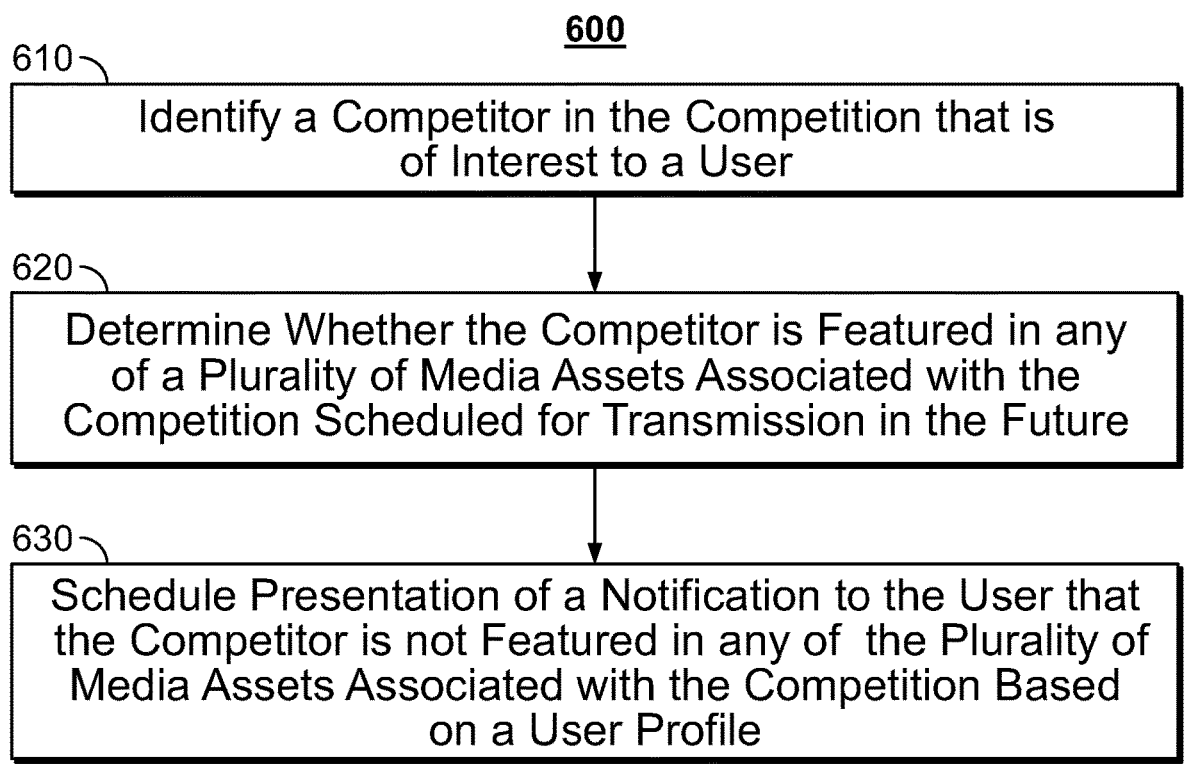
FIG. 6 is a flowchart of an illustrative process for scheduling presentation of a notification to the user in accordance with some embodiments of the disclosure.

FIG. 6 is a flowchart of illustrative steps of a process 600 for scheduling presentation of a notification to the user in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to schedule the presentation of a notification to the user. In addition, one or more steps of process 600 may be incorporated into or combined with one or more steps of any other process or embodiment (e.g., as described in relation to FIGS. 1 and 7-10)).

At step 610, the media guidance application identifies a competitor in the competition that is of interest to a user (e.g., via control circuitry 404). In some embodiments, identifying the competitor comprises receiving search criteria from the user specifying a team or player. For example, the user may enter the name of a team or player into a search box. In some embodiments, identifying the competitor comprises searching a user profile to identify a team or player that is associated with the user. For example, the user may have a viewing history that has multiple occurrences of the user watching baseball games featuring the New York Yankees. In turn, the media guidance application may identify the New York Yankees as a competitor of interest to the user.

At step 620, the media guidance application determines (e.g., via control circuitry 404 (FIG. 4)) whether the competitor is featured in any of the plurality of media assets associated with the competition scheduled for transmission in the future (e.g., via the media content source 516 (FIG. 5)). For example, the media guidance application may search for information about upcoming playoff games scheduled for broadcasting or streaming. Specifically, the media guidance application may retrieve the detailed information from media guidance data (e.g., from media guidance data source 518 (FIG. 5)) that includes scheduled broadcast times and sources for video broadcasts of the games. The media guidance application may also retrieve the detailed information from other data sources such as Internet data feeds. The media guidance application may determine the type of sport based on metadata included in retrieved media guidance data, or based on information included in the user command. The media guidance application may also determine whether the request corresponds to a season games or a playoff tournament.

At step 630, the media guidance application schedules presentation of a notification to the user (e.g., via control circuitry 404 (FIG. 4)) that the competitor is not featured in any of the plurality of media assets associated with the competition based on a user profile. The notification may be displayed on display 412 as an overlay on the user input interface 410 (FIG. 4). A competitor may not be featured in the plurality of media assets associated with the competition if the competitor was previously eliminated, if the competitor did not qualify to participate in the competition, or if the competition has ended. For example, if the competition is the baseball playoffs and the competitor is the New York Yankees, the media guidance application may not find upcoming video game broadcasts featuring the New York Yankees if the New York Yankees did not qualify for the playoffs based on their regular season performance. Likewise, the New York Yankees may not have scheduled games because the team was eliminated during the playoffs.

Scheduling presentation of a notification to the user is initiated by control circuitry 404 (FIG. 4). Control circuitry first determines whether the user is aware of the outcome of the competition using the methods discussed previously (e.g., checking if the user has seen the competition or an alternative media asset featuring the competition result). Control circuitry 404 may refer to the user profile stored in storage 408 to retrieve the user's viewing history. If control circuitry determines, based on the viewing history, that the user is viewing or has viewed either the stored, scheduled broadcast, or an alternative media asset of the competition featuring the competitor, the presentation of a notification may be scheduled when the user has completed viewing the media asset. Once the user has completed viewing the media asset, control circuitry may retrieve information about the competition featuring the competitor from the media guidance data source 418. This information may include scores, video highlights, audio commentary, and images associated with the competition featuring the competitor and is presented in the second selectable option 126 (FIG. 1). Control circuitry generates overlay 120 (FIG. 1) on the user input interface 410 which is presented on display 412 (FIG. 4). In the case where the media guidance application determines that the user has not viewed at least one of the stored, scheduled broadcast, or alternative media assets, the media guidance application delays the presentation of the notification and schedules presentation based on the availability of the user (discussed in FIG. 10).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 6.

Figure 7:
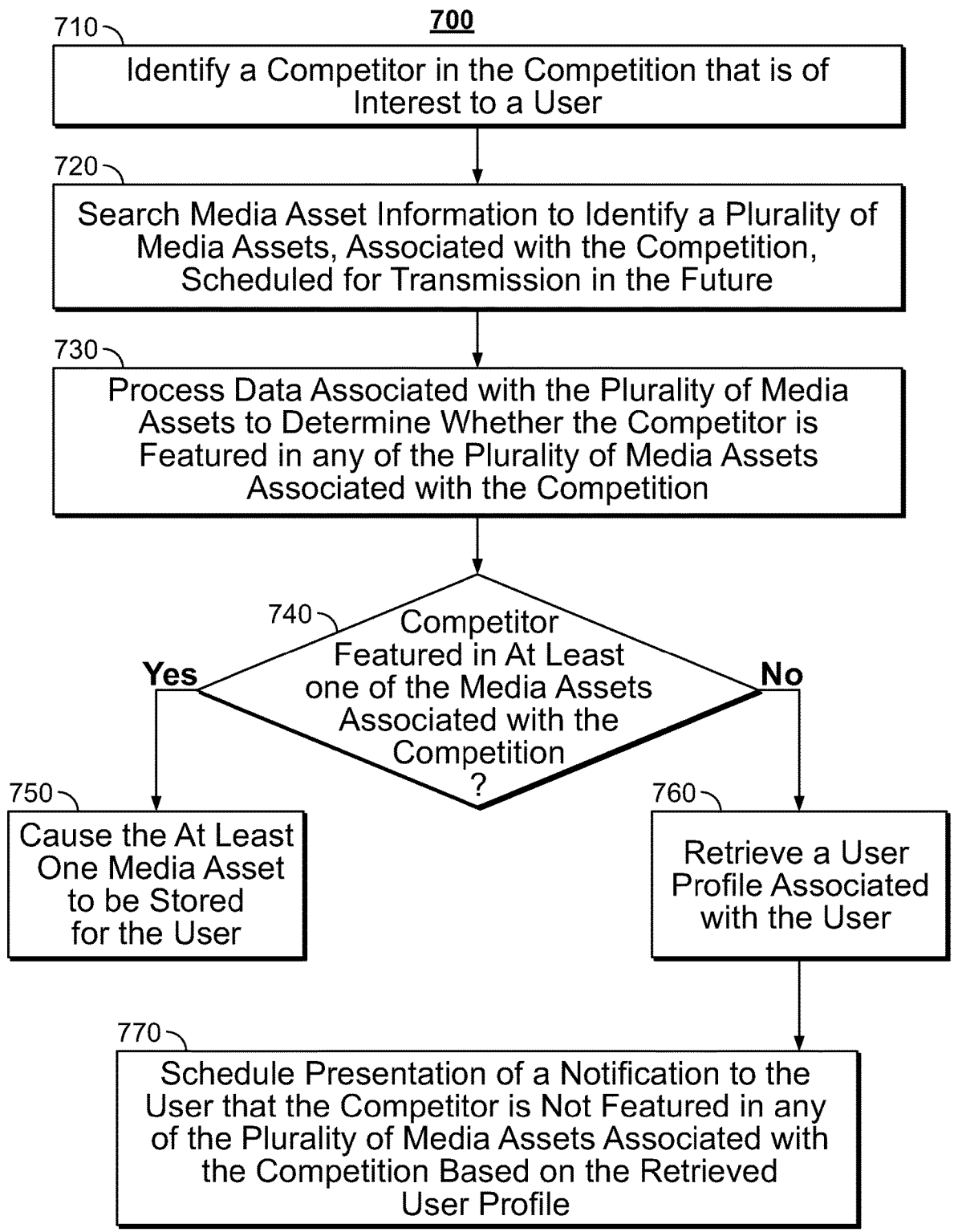
FIG. 7 is a flowchart of a detailed illustrative process for scheduling presentation of a notification to the user in accordance with some embodiments of the disclosure.

FIG. 7 is a flowchart of illustrative steps of a process 700 for scheduling presentation of a notification to the user in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to schedule the presentation of a notification to the user. In addition, one or more steps of process 700 may be incorporated into or combined with one or more steps of any other process or embodiment (e.g., as described in relation to FIGS. 1, 6 and 8-10)).

At step 710, the media guidance application identifies a competitor in the competition that is of interest to a user (e.g., via control circuitry 404 (FIG. 4)). This step corresponds to step 610, discussed previously. At step 712, the media guidance application searches media asset information to identify a plurality of media assets associated with the competition, scheduled for transmission in the future. Once again, the media guidance application may retrieve the detailed information from media guidance data (e.g., from media guidance data source 518 (FIG. 5)) that includes scheduled broadcast times and sources for video broadcasts of the games. The media guidance application may search for the competition that is of interest to the user and the competitor in the media guidance data to retrieve specific broadcast times and sources for video broadcasts pertaining to the competitor and the competition. It should be noted that competitors may participate in multiple competitions at different times. For example, if the media guidance application identifies Lionel Messi as the competitor, the competition may be the FIFA Club World Cup (worldwide competition) or La Liga (domestic competition). If the user finds worldwide competitions of interest, then the competitor, Lionel Messi, may be identified in the competition FIFA Club World Cup.

At step 730, the media guidance application processes data (e.g., via control circuitry 404 (FIG. 4)) associated with the plurality of media assets to determine whether the competitor is featured in any of the plurality of media assets associated with the competition. For example, suppose the competitor is the team the New York Yankees. The media guidance application may process data associated with the playoff games to determine that the New York Yankees will be featured in the playoffs. In some embodiments, processing data comprises receiving a competition result associated with the identified competitor, retrieving a competition rule associated with the competition, and determining based on the competition rule and the competition result that the identified competitor does not advance from a first portion to a second portion of the competition. For example, the competition result may indicate that the New York Yankees had three runs and the Boston Red Sox, their opposition, had five runs in the first portion of the competition (e.g., conference championship series). The competition rule may state that the competitor with four wins out of seven games may advance to the second portion of the competition, the World Series. The media guidance application may determine that the New York Yankees had two wins in the series, while the Boston Red Sox managed to win four games in the series. Based on the competition rule, the New York Yankees will not advance to the World Series. The media guidance application may determine that the team of interest has won a game broadcast on a certain day by parsing data streams of the competition for that day.

At step 740, the media guidance application determines (e.g., via control circuitry 404 (FIG. 4)) whether the competitor is featured in at least one of the media assets associated with the competition. Based on the example previously given, the media guidance application may determine that the Yankees are not scheduled for another game, due to their loss to the Boston Red Sox. The media guidance application may also determine from the media guidance data source 518 (FIG. 5) that the New York Yankees do not have upcoming games in their schedule.

In response to determining that the competitor will be featured in at least one of the media assets associated with the competition, the media guidance application causes the at least one media asset to be stored for the user (e.g., in storage such as RAM, ROM, Hard Disk, Removable Disk, etc. 408 (FIG. 4)) at step 750. For example, the media guidance application may determine that a playoff game broadcast is scheduled for 8:00 pm Thursday and will feature the New York Yankees. The media guidance application may further create an identifier for the media asset and add it to the list of scheduled recordings. For example, the identifier may be a title stating "American League Conference Championship Game 2: New York Yankees vs Boston Red Sox." On Thursday at 8:00 pm, the media guidance application (e.g., via control circuitry 404 (FIG. 4)) may store the media asset for the user. If the competition has already passed, the media guidance application may also download the media asset from an on-demand server (e.g., media content source 516 (FIG. 5)).

In response to determining that the competitor will not be featured in at least one of the media assets associated with the competition, the media guidance application retrieves a user profile (e.g., from storage such as RAM, ROM, Hard Disk, Removable Disk, etc. 408 (FIG. 4)) associated with the user at step 760. The user profile may detail the user's viewing history, his/her preferences with respect to recording scheduled media assets, and/or favorite teams and players. It should be noted that the media guidance application may serve multiple users and each user may have specific preferences and competitors of interest. Thus, the media guidance application may prompt users to identify themselves on the user input interface 410 (FIG. 4). For example, the media guidance application may accommodate three users: user A, user B, and user C. If user A is using the media guidance application, the user may need to log in to the media guidance application or the media guidance application may prompt the user to select, from a menu, the user's profile name.

At step 770, the media guidance application schedules (e.g., via control circuitry 404 (FIG. 4)) presentation of a notification (e.g., overlay 120 (FIG. 1)) to the user that the competitor is not featured in any of the plurality of media assets associated with the competition based on the retrieved user profile. For example, the media guidance application may determine that New York Yankees are not featured in any of the upcoming playoff game broadcasts. This may signify that the New York Yankees have been eliminated from the playoffs, or were not a part of the competition altogether. If the competition is the MLB regular season, the New York Yankees not being featured in future baseball game broadcasts can signify that the team's season has ended. In response, the media guidance application may schedule a notification for the user based on the user's profile. For example, this notification may inform the user that the New York Yankees have been eliminated from the MLB playoffs or their season has ended, as showcased in overlay 120 (FIG. 1). Suppose the retrieved user profile details that the user is currently watching all stored media assets associated to the MLB playoffs, featuring the New York Yankees. If the New York Yankees won in the first round and were eliminated in the second round, the media guidance application may schedule the notification that the New York Yankees were eliminated after the user has completed watching all stored media assets associated to the MLB playoffs, featuring the New York Yankees.

In the case where the media guidance application cannot technically determine whether the user is aware of the outcome of the result (e.g., the user finds out the outcome in a conversation with a friend), the media guidance application must delay the presentation of the notification until it confirms that the user is aware of the outcome. To prevent spoilers, the media guidance application must take additional measures into consideration. For example, the user may choose to review the list of scheduled recordings. If the competitor has been eliminated, the media guidance application may place phantom media asset identifiers into the list of scheduled recordings. These phantom media asset identifiers will prevent the user from assuming that his/her team has been eliminated (e.g., without the phantom media asset identifiers, the absence of scheduled media assets for recording may indicate that the competitor is no longer in the competition). For example, the competition of interest to the user may be the American League Conference Championship series of the MLB playoffs. The media guidance application may identify that the competition rule is a best-of-seven series and that the team with the majority of wins is expected to advance to the next round. When the competition begins, the media guidance application may add seven phantom media asset identifiers with incremental names. For example, the first phantom media asset identifier may be titled "American League Conference Championship Game 1," and the second phantom media asset identifier may be titled "American League Conference Championship Game 2" and so on. Information regarding the timings of the phantom media asset identifiers may be retrieved from sources including, but not limited to, Internet data sources such as RSS feeds, social media sources, and news sources.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 7.

Figure 8:
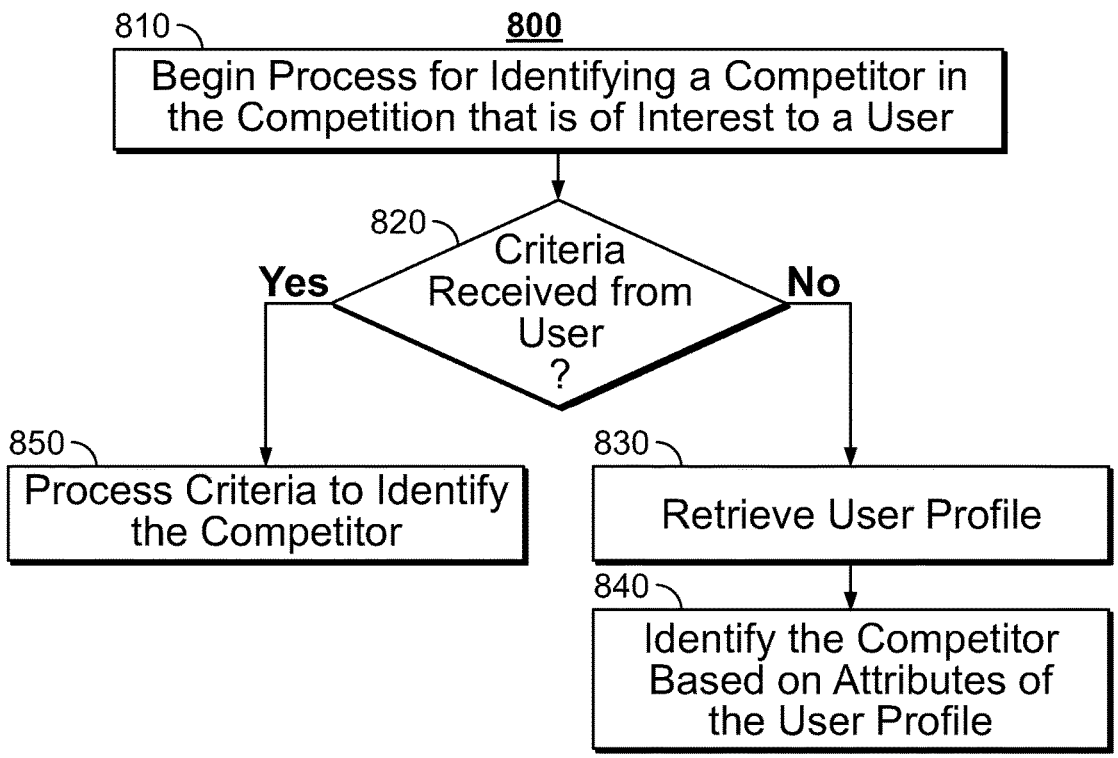
FIG. 8 is a flowchart of an illustrative process for identifying a competitor based on the attributes of the user profile in accordance with some embodiments of the disclosure.

FIG. 8 is a flowchart of illustrative steps of a process 800 for identifying the competitor based on attributes of the user profile in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to identify the competitor based on attributes of the user profile. In addition, one or more steps of process 800 may be incorporated into or combined with one or more steps of any other process or embodiment (e.g., as described in relation to FIGS. 1, 6, 7 and 9-10)).

At step 810, the media guidance application begins the process for identifying a competitor in the competition that is of interest to a user. In this process, the media guidance application may utilize the media guidance data source 518, the media content source 516, and control circuitry 404, to identify a competitor, which may be a team or player.

At step 820, the media guidance application determines whether the user has provided search criteria (e.g., on user input interface 410 via I/O path 402 (FIG. 4)) in order for the media guidance application to identify a competitor. For example, the user may enter the name of a player or team in a search box in the media guidance application. Suppose the user enters "New York Yankees," or "Aaron Judge" into the search box. The media guidance application may acknowledge (e.g., via control circuitry 404 (FIG. 4)) that the criteria have been received. The user may also provide the search criteria through selectable options 124 and 128 (FIG. 1). As discussed previously, selectable option 124 allows the user to select a competitor for the media guidance application to record. If the original competitor selected by the user is eliminated, the media guidance application may offer alternatives to the user that can be recorded. These alternatives may include, but are not limited to, the opposition that eliminated the user's competitor and the user's next preferred team based on the user profile.

In response to determining that the media guidance application criteria have been received from the user, the media guidance application processes (e.g., via control circuitry 404 (FIG. 4)) the criteria to identify the competitor at step 850. For example, upon acknowledging that the user has entered "New York Yankees," or "Aaron Judge," the media guidance application may identify that the sport associated with the user input is baseball. Furthermore, the media guidance application may identify that the competition is the MLB regular season, and therefore the competitor is a MLB baseball team or MLB baseball player, respectively. Since Aaron Judge is a baseball player playing for the New York Yankees, the media guidance application may potentially not find media assets featuring the competitor because of injuries or trades. In some embodiments, control circuitry 404 may retrieve media guidance data (e.g., from media guidance data source 518 or another suitable source), and then parse the media guidance data provided for key words or metadata relating to the competition. For example, the control circuitry 404 may parse the media guidance data for instances of games that are part of a competition (e.g., MLB season games), in which the specified competitor (e.g., the New York Yankees) is expected to participate.

In response to determining that the media guidance application criteria have not been received from the user, the media guidance application retrieves the user profile (e.g., from storage such as RAM, ROM, Hard Disk, Removable Disk, etc. 408 (FIG. 4)) at step 830. For example, the user may not specify or provide a competitor that he/she is are interested in. In this case, the media guidance application may refer to the user profile to determine attributes that can indicate the user's preference. The user profile may include the user's viewing history or favorite teams.

At step 840, the media guidance application identifies the competitor based on attributes of the user profile. For example, the user may indicate on his/her user profile a favorite team, the New York Yankees, or a favorite player, Aaron Judge. The media guidance application may also determine that the user likes local New York sports teams, or has viewed multiple broadcasts of MLB games featuring the New York Yankees. In response, the media guidance application may identify the New York Yankees as the competitor of interest.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 8.

Figure 9:
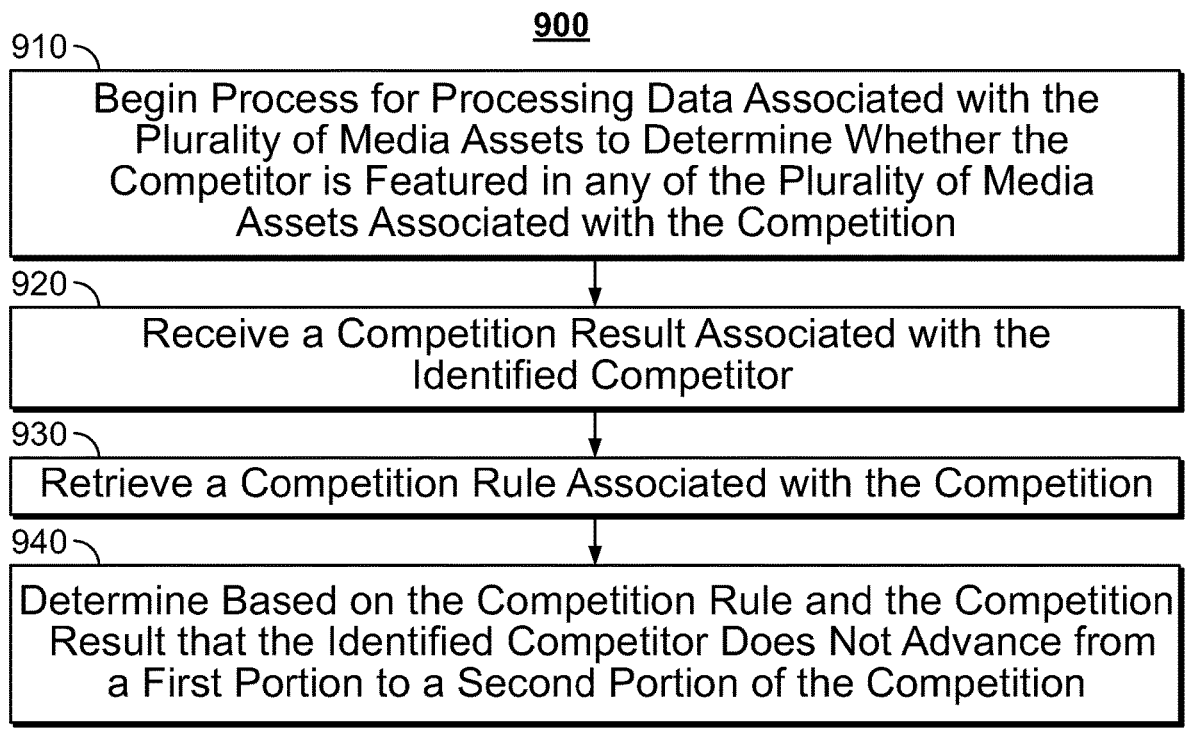
FIG. 9 is a flowchart of an illustrative process for determining that the identified competitor does not advance from a first portion to a second portion of the competition in accordance with some embodiments of the disclosure.

FIG. 9 is a flowchart of illustrative steps of a process 900 for determining that the identified competitor does not advance from a first portion to a second portion of the competition in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to determine that the identified competitor does not advance from a first portion to a second portion of the competition. In addition, one or more steps of process 900 may be incorporated into or combined with one or more steps of any other process or embodiment (e.g., as described in relation to FIGS. 1, 6-8, and 10)).

At step 910, the media guidance application begins the process for processing data associated with the plurality of media assets to determine whether the competitor is featured in any of the plurality of media assets associated with the competition. For example, suppose the competitor is the team the New York Yankees. The media guidance application may begin processing data associated with the competition, the MLB playoffs, to determine whether the New York Yankees will be featured in it.

At step 920, the media guidance application receives (e.g., from media guidance data source 518 (FIG. 5)) a competition result associated with the identified competitor. Suppose for example, the competition is the MLB American League Conference Championship series. The competition may feature up to seven games, with a final score at the end of each game. Therefore, the competition result may indicate that the New York Yankees had three runs and the Boston Red Sox, their opposition, had five runs in the first portion of the competition (e.g., first game of the series). The media guidance application may determine that the team of interest has won a game broadcast on a certain day by parsing data streams received (e.g., from media content source 516 (FIG. 5)) of the competition for that day, thus determining the competition result (e.g., via control circuitry 404 (FIG. 4)). The media guidance application may also retrieve result information about at least one instance of the plurality of instances. For example, the media guidance application may retrieve information received (e.g., from media guidance data source 518 or communication network 514 (FIG. 5)) from Internet data sources (e.g., RSS feeds, news sources, social media sources, etc.) that include a score and indication of a winner of a game. The media guidance application may determine a competition result from the result information. In some embodiments, control circuitry 404 may determine a competition result based on professional commentary and/or social media commentary. For example, control circuitry 404 may retrieve a news article (e.g., including text of the news article and/or images), and analyze the text and images to determine a competition result (e.g., that a participant of interest did win a competition or did not win a competition).

At step 930, the media guidance application retrieves a competition rule (e.g., from media guidance data source 518 (FIG. 5)) associated with the competition. Revisiting the previous example, the competition rule may state that the competitor with four wins out of seven games may advance to the second portion of the competition, the World Series. The media guidance application may determine that the New York Yankees had two wins in the series, while the Boston Red Sox managed to win four games in the series. In some embodiments, the competition rule may also be a deterministic rule, and the media guidance application may apply the competition result to estimate the rank by determining a change in the rank of the participant. For example, the deterministic rule of the competition rule may enable a determination of an outcome of the competition with certainty based on whether a certain condition has been met based on a portion of the competition that has taken place. This is a common case in "best-of" games and regular season competitions. For example, the deterministic rule may be a best-of-seven-games rule, where a participant advances to a subsequent round of competition by winning a simple majority of seven games within a round of the competition. For example, the media guidance application may determine that a baseball team has won four games, based on a score of a current game, and score information about three prior games in which the baseball team played, and determine that the deterministic rule has been satisfied.

In some embodiments, the media guidance application may determine, based on media guidance data, that the competition relates to a tournament at the conclusion of a season, instead of regular season games, and that the competition relates to baseball. For example, the media guidance application may determine the tournament is a double elimination tournament based on determining that the competition is for a baseball tournament. For example, the media guidance application may determine that a set of inputs for the competition rule includes a number of times that a team of interest has lost a game.

At step 940, the media guidance application determines (e.g., via control circuitry 404 (FIG. 4)), based on the competition rule and the competition result, that the identified competitor does not advance from a first portion to a second portion of the competition. For example, the media guidance application may identify a best-of-seven series from the MLB American League Conference Championship as the competition. The media guidance application may further determine that the competition rule requires the competitor to win a majority of the seven games. The media guidance application may determine that the user's competitor, the New York Yankees, had two wins in the series, while the Boston Red Sox managed to win four games in the series. Thus, the Boston Red Sox would advance to the World Series and the New York Yankees would be eliminated. The media guidance application may therefore determine, based on the competition result and the competition rule, that the New York Yankees will not advance from the first portion of the competition (e.g., MLB American League Conference Championship) to the second portion of the competition (e.g., MLB World Series).

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 9.

Figure 10:
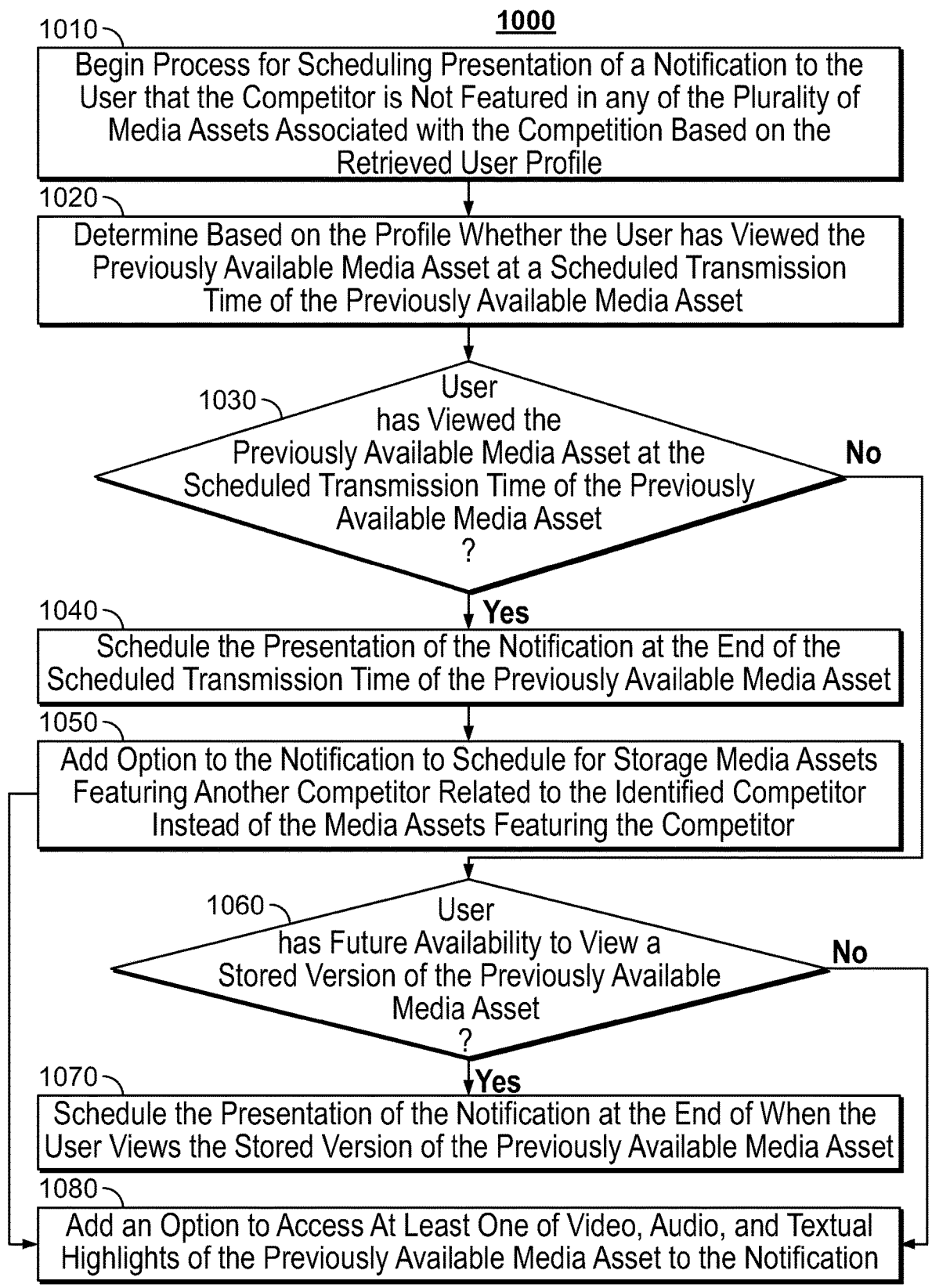
FIG. 10 is a flowchart of an illustrative process for scheduling presentation of a notification based on user availability in accordance with some embodiments of the disclosure.

FIG. 10 is a flowchart of illustrative steps of a process 1000 for scheduling presentation of a notification based on user availability in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to schedule presentation of a notification based on user availability. In addition, one or more steps of process 1000 may be incorporated into or combined with one or more steps of any other process or embodiment (e.g., as described in relation to FIGS. 1 and 6-9)).

At step 1010, the media guidance application begins the process for scheduling presentation of a notification to the user that the competitor is not featured in any of the plurality of media assets associated with the competition based on the retrieved user profile. This step may be the result of steps discussed previously: 620, 760, and 940.

At step 1020, the media guidance application determines (e.g., via control circuitry 404 (FIG. 4)), based on the user profile (e.g., from storage 408 (FIG. 4)), whether the user has viewed the previously available media asset at a scheduled transmission time of the previously available media asset. For example, suppose the user has viewed the second game's broadcast of the MLB American League Conference Championship series at the time of its scheduled transmission. The media guidance application may retrieve the user profile and refer to the user's viewing history. The viewing history may indicate that the user has viewed the broadcast and the media guidance application may confirm that the previously available media asset has been viewed. At step 1030, the media guidance application provides a decision (e.g., via control circuitry 404 (FIG. 4)) on whether the user has viewed the previously available media asset at a scheduled transmission time of the previously available media asset.

At step 1040, in response to determining that the user has viewed the previously available media asset at a scheduled transmission time of the previously available media asset, the media guidance application schedules (e.g., via control circuitry 404 (FIG. 4)) the presentation of the notification at the end of the scheduled transmission time of the previously available media asset. Adding on to the previous example, the user may have watched the final game broadcast of the MLB American League Conference Championship at its scheduled transmission time of 8:00 pm. The game may have ended at 11:30 pm, during which the media guidance application may determine that the New York Yankees are not advancing to the MLB World series, based on the competition result and competition rule (e.g., the New York Yankees' opponent won a majority of the seven games). The media guidance application may then schedule presentation of the notification at 11:30 pm, which may be displayed as an overlay 120 (FIG. 1). The notification would inform the user that the New York Yankees have been eliminated from the competition and therefore future media assets may no longer be available.

At steps 1050 and 1080, the media guidance application adds options to the notification that the user may choose from (e.g., access from user input interface 410 and delivered via I/O path 402 (FIG. 4)). The media guidance application adds the option to schedule for storage media assets featuring another competitor related to the identified competitor instead of the media assets featuring the competitor. This may be executed as the first selectable option 124 (FIG. 1). For example, the media guidance application may offer the user the option to schedule recordings of upcoming media assets featuring the Boston Red Sox, the team that eliminated the New York Yankees. The media guidance application also adds an option to access at least one of video, audio, and textual highlights of the previously available media asset to the notification. This may be executed as the second selectable option 126 (FIG. 1). For example, the user may select to view video, audio, or textual information about his/her competitor's performance in their last game. This information may be displayed in the form of a game summary, a box-score, video highlights of key plays, post-game analysis by sports analysts, and commentary from the game. For example, the user may select option 126, generated at step 1080, to be informed that the final score of the New York Yankees vs the Boston Red Sox game was one to three, and to view prominent moments of the game such as exceptional catches and homeruns.

At step 1060, in response to determining that the user has not viewed the previously available media asset at a scheduled transmission time of the previously available media asset, the media guidance application determines (e.g., via control circuitry 404 (FIG. 4)) whether the user has future availability to view a stored version of the previously available media asset. Revisiting the previous example, the user may not have viewed the final game broadcast of the MLB American League Conference Championship featuring the New York Yankees. Thus, the media guidance application may determine that the user has not viewed the game stream because the user profile does not include the game stream in the viewing history. In some embodiments, determining whether the user has future availability to view the stored version of the previously available media asset comprises retrieving a calendar associated with the user, identifying content a user plans to access based on the calendar, and determining whether there is a gap in the calendar in which the user does not plan to access content that has a length corresponding to a duration of the stored version of the previously available media asset. For example, the media guidance application may refer to the user profile and retrieve the user's weekly schedule of media assets. Suppose the New York Yankees' game broadcast for the MLB American League Conference Championship is three hours long. If the user's calendar indicates that the user intends to watch "Game of Thrones" between 3:00 pm and 4:00 pm, followed by "CNN News" between 8:00 pm and 9:00 pm, the media guidance application may determine that the user is free for four hours between 4:00 pm and 8:00 pm. Therefore, the user can watch the stored video of the game.

In some embodiments, the media guidance application may determine (e.g., via control circuitry 404 (FIG. 4)) that the user does not have future availability to view a stored version of the previously available media asset. For example, the media guidance application may refer to the user profile and retrieve the user's weekly schedule of media assets. The user's calendar may indicate that the user intends to watch "Game of Thrones" between 3:00 pm and 4:00 pm, followed by "The Simpsons" between 4:00 pm and 8:00 pm, and "CNN News" between 8:00 pm and 9:00 pm, every day. Suppose the user watches stored media only between 3:00 pm and 9:00 pm. Thus, the media guidance application may determine that the user will not be available to view the MLB American League Conference Championship game featuring the New York Yankees.

At step 1070, in response to determining that the user has future availability to view a stored version of the previously available media asset, the media guidance application schedules (e.g., via control circuitry 404 (FIG. 4)) the presentation of the notification immediately after the user views the stored version of the previously available media asset. For example, the user may begin watching the stored version of the MLB American League Conference Championship game featuring the New York Yankees two days after the scheduled transmission of the game's broadcast. Upon completing viewing the stored version of the game or stopping the stored version without intentions of completing viewing, the media guidance application may present the user with the notification as the overlay 120 (FIG. 1). Until the user has been made aware of the outcome of the competition, the media guidance application will preserve phantom media asset identifiers in the list of scheduled recordings. This will prevent the user from determining the result of the competition based on the list of scheduled recordings. Information regarding the timings of the phantom media asset identifiers may be retrieved from sources including, but not limited to, Internet data sources such as RSS feeds, social media sources, and news sources.

At step 1080, in response to determining that the user does not have future availability to view a stored version of the previously available media asset, the media guidance application schedules (e.g., via control circuitry 404 (FIG. 4)) presentation of the notification and adds to the notification an option to access at least one of video, audio, and textual highlights of the previously available media asset. In some embodiments, alongside the notification, the media guidance application may provide a summary of the game score, and provide highlights of important plays in the game and analysis of player and team performance. This may be executed as the second selectable option 126 (FIG. 1). Prior to scheduling presentation of a notification, the media guidance application may request the user to confirm whether the user intends to view the stored version of the previously available media asset through a prompt on the user input interface 410 for display 412 (FIG. 4). If the user intends to view the stored version of the previously available media asset, the media guidance application may present the user with the list of scheduled recordings in order to allow the user to adjust the schedule. In response, the media guidance application may schedule presentation of the notification immediately after the user has viewed the stored version of the previously available media asset. If the user does not intend to view the stored version, in response the media guidance application may present the notification immediately.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 10.

It should be understood that the competitions discussed herein could refer to sports competitions, academic competitions, electronic gaming competitions, voting competitions or any other suitable competition. For example, in the case of voting competitions, control circuitry 404 could receive a request to record all debates for a political party's primary elections, as long as a candidate (e.g., a participant of interest) is likely to appear in the primary elections. Because the ranking of candidates in primary elections is highly dynamic, it may follow a probabilistic rule as discussed previously. In the case of electronic gaming competitions and academic competitions (e.g., quiz bowls), "best of N" or "N elimination" rules are typically.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for avoiding spoilers in presenting recording prompts relating to a competition, the method comprising:
    identifying a competitor in the competition that is of interest to a user;
    searching media asset information to identify a plurality of media assets, associated with the competition, scheduled for transmission in the future;
    processing data associated with the plurality of media assets to determine whether the competitor is featured in any of the plurality of media assets associated with the competition;
    in response to determining that the competitor is featured in at least one of the media assets associated with the competition, causing the at least one media asset to be stored for the user; and
    in response to determining that the competitor is not featured in any of the plurality of media assets associated with the competition:
        retrieving a user profile associated with the user to determine whether the user has viewed a previously available media asset featuring the competitor during a scheduled transmission of time; and
        in response to determining that the user has viewed the previously available media asset featuring the competitor during the scheduled time, scheduling presentation of a notification to the user at an end of the scheduled transmission of the previously available media asset, that the competitor is not featured in any of the plurality of media assets associated with the competition.

2. The method of claim 1, wherein identifying the competitor comprises receiving search criteria from the user specifying a team or player.

3. The method of claim 1, wherein identifying the competitor comprises searching a user profile to identify a team or player that is associated with the user.

4. The method of claim 1, wherein processing data comprises:
    receiving a competition result associated with the identified competitor;
    retrieving a competition rule associated with the competition;
    determining based on the competition rule and the competition result that the identified competitor does not advance from a first portion to a second portion of the competition.

5. The method of claim 4, wherein the competition result is associated with the previously available media asset featuring the competitor.

6. The method of claim 5 further comprising:
    in response to determining the user has not viewed the previously available media asset featuring the competitor during the scheduled transmission time:
        determining, based on the user profile, whether the user has future availability to view a stored version of the previously available media asset; and
        in response to determining the user has future availability to view the previously available media asset, scheduling the presentation of the notification at the end of when the user views the stored version of the previously available media asset.

7. The method of claim 6 further comprising:
    in response to determining the user does not have future availability to view a stored version of the previously available media asset:
        scheduling the presentation of the notification at the end of the scheduled transmission time; and
        causing to be presented with the notification a summary of the previously available media asset, wherein the summary includes an option to access at least one of video, audio, and textual highlights of the previously available media asset.

8. The method of claim 6, wherein determining whether the user has future availability to view the stored version of the previously available media asset comprises:
    retrieving a calendar associated with the user;
    identifying content a user plans to access based on the calendar; and
    determining whether there is a gap in the calendar in which the user does not plan to access content that has a length corresponding to a duration of the stored version of the previously available media asset.

9. The method of claim 1, wherein the notification includes an option to schedule for storage media assets featuring another competitor related to the identified competitor instead of the media assets featuring the competitor.

10. A system for avoiding spoilers in presenting recording prompts relating to a competition, the system comprising:
    control circuitry configured to:
    identify a competitor in the competition that is of interest to a user;
    search media asset information to identify a plurality of media assets, associated with the competition, scheduled for transmission in the future;
    process data associated with the plurality of media assets to determine whether the competitor is featured in any of the plurality of media assets associated with the competition;
    in response to determining that the competitor is featured in at least one of the media assets associated with the competition, cause the at least one media asset to be stored for the user; and
    in response to determining that the competitor is not featured in any of the plurality of media assets associated with the competition:
    retrieve a user profile associated with the user to determine whether the user has viewed a previously available media asset featuring the competitor during a scheduled transmission of time; and
    in response to determining that the user has viewed the previously available media asset featuring the competitor during the scheduled time, schedule presentation of a notification to the user at an end of the scheduled transmission of the previously available media asset, that the competitor is not featured in any of the plurality of media assets associated with the competition.

11. The system of claim 10, wherein the control circuitry is configured to identify the competitor comprises by receiving search criteria from the user specifying a team or player.

12. The system of claim 10, wherein the control circuitry is configured to identify the competitor comprises by searching a user profile to identify a team or player that is associated with the user.

13. The system of claim 10, wherein the control circuitry is configured to process data by:
   receiving a competition result associated with the identified competitor;
   retrieving a competition rule associated with the competition; and
   determining based on the competition rule and the competition result that the identified competitor does not advance from a first portion to a second portion of the competition.

14. The system of claim 13, wherein the competition result is associated with the previously available media asset featuring the competitor.

15. The system of claim 14, wherein the control circuitry is further configured to:
   in response to determining the user has not viewed the previously available media asset featuring the competitor during the scheduled transmission time:
   determine, based on the user profile, whether the user has future availability to view a stored version of the previously available media asset; and
   in response to determining the user has future availability to view the previously available media asset, schedule the presentation of the notification at the end of when the user views the stored version of the previously available media asset.

16. The system of claim 15, wherein the control circuitry is further configured to:
   in response to determining the user does not have future availability to view a stored version of the previously available media asset:
   schedule the presentation of the notification at the end of the scheduled transmission time; and
   cause to be presented with the notification a summary of the previously available media asset, wherein the summary includes an option to access at least one of video, audio, and textual highlights of the previously available media asset.

17. The system of claim 15, wherein the control circuitry is further configured to determine whether the user has future availability to view the stored version of the previously available media asset by:
   retrieving a calendar associated with the user;
   identifying content a user plans to access based on the calendar; and
   determining whether there is a gap in the calendar in which the user does not plan to access content that has a length corresponding to a duration of the stored version of the previously available media asset.

18. The system of claim 10, wherein the notification includes an option to schedule for storage media assets featuring another competitor related to the identified competitor instead of the media assets featuring the competitor.

* * * * *